C. J. FALKMAN.
Alcohol Still.

No. 50,884.  Patented Nov. 7, 1865.

Witnesses:

Inventor:

United States Patent Office.

CARL JOHANN FALKMAN, OF LONDON, COUNTY OF MIDDLESEX, GREAT BRITAIN.

IMPROVED APPARATUS FOR PURIFYING ALCOHOL.

Specification forming part of Letters Patent No. 50,884, dated November 7, 1865.

*To all whom it may concern:*

Be it known that I, CARL JOHANN FALKMAN, of St. Petersburg, in the Empire of Russia, but at present residing in London, in the county of Middlesex and Kingdom of Great Britain, have invented a new and Improved Apparatus for Purifying Alcoholic and other Liquids; and I do hereby declare that the following is a full, clear, and exact description of the same, which will enable those skilled in the art to make and use it, reference being had to the accompanying drawings, forming part of this specification, in which—

Figure 1:
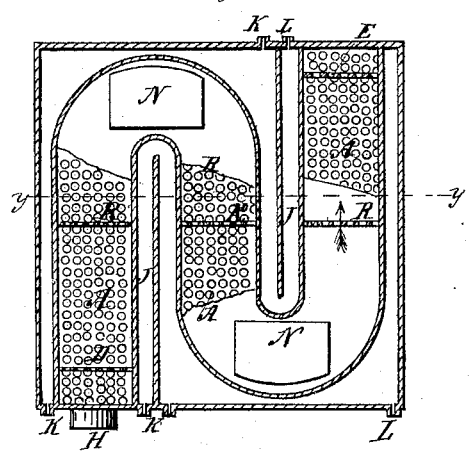
Figure 2:
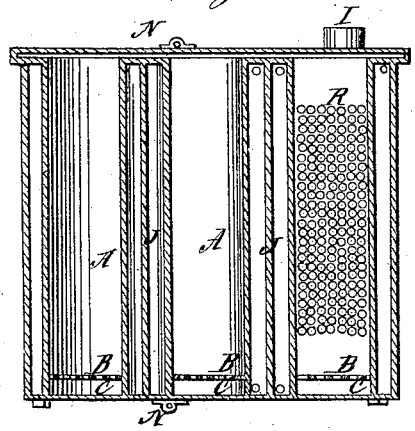
Figure 3:
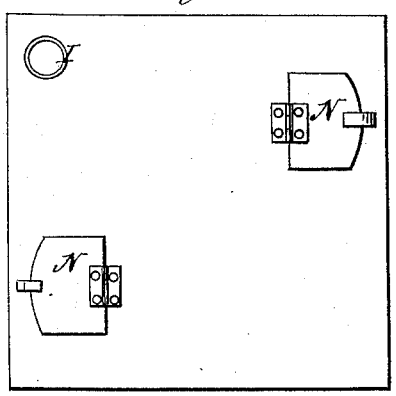
Figure 4:
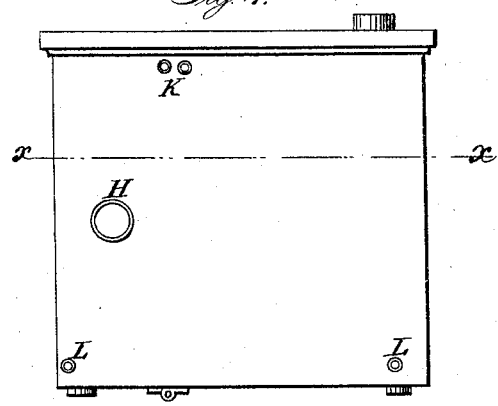

Figure 1 represents a horizontal section of this invention, the line $x\,x$, Fig. 4, indicating the plane of section. Fig. 2 is a tranverse vertical section of the same, the line $y\,y$, Fig. 1, indicating the plane of section. Fig. 3 is a plan or top view of the same. Fig. 4 is a side elevation of the same.

Similar letters of reference indicate like parts.

This invention has reference to that part of apparatus for distilling spirituous and other liquids in which the vapors, after separation from the wash or crude liquid by the process of evaporation, are purified from such impurities that are volatilized with them.

The invention consists in a new and peculiar apparatus in which the vapors produced by the distillation of alcoholic or other liquids are caused to pass in a horizontal or nearly horizontal direction through an extended bed or stratum of animal or other charcoal, or of another suitable purifying medium so arranged inside a closed receptacle or chamber, by preference of considerable length, that the fusel and watery liquor absorbed by the purifying medium from the alcoholic vapor or other impurities absorbed by said purifying medium from the vapors of other liquids shall be rapidly condensed and caused to pass off in a downward direction from among the purifying medium. By this arrangement the great advantage is gained of obtaining the continuous purifying action of the entire bed of charcoal or other absorbent medium upon the whole volume of the vapors, while the fusel and watery liquor or others impurities, as fast as separated from the vapors, are conducted away from the apparatus without having for this purpose to pass through the entire bed of charcoal, and to come in intimate contact with the whole volume of vapors passing through in the contrary direction, as practiced in apparatuses of the ordinary construction.

The form of apparatus for carrying out the the above-described process of purification can be varied in a great many different ways, and I do not wish to confine myself to the precise arrangement shown in the drawings, but reserve the right to change the same as may be desirable.

A A represent a long narrow channel, of considerable hight in proportion to its width, which channel is filled entirely with animal or other charcoal, or other purifying medium, and is made of any suitable air-tight material, by preference a good conductor of heat. In the drawings this channel is shown in a serpentine form, in order to economize space; but it may be either straight in its entire length, or bent into any other convenient form. Said channel is hermetically closed at the top and sides, and it has a perforated bottom, B, through which it communicates with the receptacle C, having the same form as the channel, and fixed thereto in an air-tight manner; or it may be formed in one with the channel A.

In the channel A, and near to its extremities, are perforated plates D E, and access is had to the spaces outside these plates by means of pipes H and I, one of which connects with a distilling apparatus, and the other with a condenser of any desired description.

The channel A is inclosed in a tank, J, through which cold water, is made to flow, passing in and flowing off through the pipes K and L, which water, coming in contact with the external surfaces of the chamber, abstracts heat therefrom, and consequently cools the contents of such chamber.

The purifying or absorbent material which fills the channel A is introduced at the top through openings formed by making portions N N of the top surface to open on hinges, as indicated, which, when the apparatus is in operation, are closed down hermetically by means of screw-bolts. In order to remove the charcoal or other purifying medium when no longer fit for use, other apertures, O O, are formed in the perforated bottom B, passing through the receptacle C below, which apertures are also closed hermetically when the apparatus is in operation.

When the apparatus is used for purifying alcoholic vapors, for instance, the unpurified vapors passing from the distilling apparatus through the pipe H will enter the channel A through the perforated plate D, and will have to travel in a horizontal or nearly horizontal direction through the entire length of the chamber, in order to pass through the perforated plate E to the condenser, as indicated by the arrows in Fig. 2. In thus permeating through the entire bed of charcoal or other purifying medium contained in the channel, cooled by the current of water flowing through the tank J, the fusel and watery liquor combined in the alcoholic vapors gradually condense and separate from the vapors, and pass in a downward direction through the bed of charcoal, from which it drains through the perforated bottom B into the receptacle C.

The upper portion of the bed of charcoal, through which the alcoholic vapors will mainly pass, will always be comparatively free from fusel and watery liquor, and it is evident that the farther the vapors proceed in the chamber the greater will be the depth of charcoal or other purifying medium free from fusel and watery liquor, and therefore the more perfect will be the action of such purifying medium upon the alcoholic vapors, which will consequently pass out of the channel A through the perforated plate E in a perfectly-purified state. As through imperfect filling, or through the settling down of the charcoal or other purifying medium, a small space may exist between the upper surface of the purifying medium and the top of the chamber A, through which a small quantity of the alcoholic vapors might pass without becoming purifyed, partitions R, attached at intervals to the top and sides of the channel, are made to pass down any required distance into the purifying medium, thus causing any such portions of alcoholic vapors that may creep along the top of the chamber to pass down through the purifying medium, in order to get past such partitions. Said partitions might also be made to pass alternately from the top of the chamber down nearly to the perforated bottom, and from the perforated bottom up nearly to the top, so that the alcoholic vapors would have to pass continually up and down in a vertical direction through the purifying medium ; but as by this means the alcoholic vapor would be continually brought into intimate contact with the fusel-liquor that is passing down through the chamber the principal advantage of my invention would not be gained.

In order to prevent any small particle of the charcoal or other purifying medium from passing with the alcoholic vapors into the condenser, the vapors are caused to pass from the pipe I through a vessel, where any particles of charcoal that have been carried with them subside, while the vapors are conducted to the condenser.

The condensed fusel and watery liquor that falls from the purifying medium into the receptacle C is conducted thence through suitable pipes back into the distilling apparatus.

The perforated bottom B and the receptacle C below the channel may in some cases be dispensed with, and the chamber A simply provided with a bottom made to slope down either to one end of the same or to various points in its length, to which points pipes are connected for drawing off the liquor that drains down to such points.

When the perforated bottom B and the receptacle C are used partitions should be formed at intervals across said receptacle, so as to prevent any alcoholic vapors from creeping through such receptacle without passing through the channel A.

As previously stated, the form of my apparatus may be variously modified. Thus, instead of making it of a serpentine form, it may be arranged spirally, or a number of annular chambers may be arranged to intercommunicate with each other.

It is also evident that my apparatus is applicable to the purification of any fluids that are capable of assuming a gaseous form, and, according to the nature of such fluid, the purifying-chamber may or may not be inclosed in the receptacle containing cold water or other cooling medium.

If it is desired to impart any particular flavor or odor to the spirituous or other liquors that are being purified, this may be effected by mixing with the purifying medium contained in the channel A such substances as will impart the desired flavor or odor to the gases or vapors as they pass through.

I claim as new and desire to secure by Letters Patent—

The within-described apparatus, composed of the serpentine channel A, jacket J, perforated bottom B, and receptacle C, with suitable supply and discharge pipes, constructed and operating substantially as and for the purpose specified.

In testimony whereof I have signed my name to this specification, in the presence of two subscribing witnesses, this fourteenth day of March, one thousand eight hundred and sixty-five.

CARL J. FALKMAN.

Witnesses:
  THOS. TAYLOR,
  C. D. ABEL,
*Both of 20 Southampton building, Chancery Lane, London.*